United States Patent
Weaver et al.

(10) Patent No.: US 6,827,801 B2
(45) Date of Patent: Dec. 7, 2004

(54) METHOD OF FOLDING TIRE BREAKER PLY EDGES

(75) Inventors: Douglas Raymond Weaver, Uniontown, OH (US); Joseph Anthony Farelli, Berlin Center, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 265 days.

(21) Appl. No.: 10/029,722

(22) Filed: Dec. 31, 2001

(65) Prior Publication Data

US 2002/0056522 A1 May 16, 2002

Related U.S. Application Data

(62) Division of application No. 09/510,779, filed on Feb. 23, 2000, now Pat. No. 6,343,638.

(51) Int. Cl.[7] .............................................. B29D 30/38
(52) U.S. Cl. ....................... 156/123; 156/133; 156/190; 156/216; 156/226
(58) Field of Search .............................. 156/123, 133, 156/124, 130, 132, 190, 194, 216, 223, 226, 414, 415, 421.4, 402, 489, 488; 152/528, 529

(56) References Cited

U.S. PATENT DOCUMENTS 4,063,987 A    12/1977    Irie et al.
4,846,907 A    7/1989    Kumagai et al.
5,437,321 A    8/1995    Breny
6,343,638 B1    2/2002    Weaver et al.

FOREIGN PATENT DOCUMENTS

DE    3908502 A1 *    9/1990
JP    54-80381 A *    6/1979
JP    60-147325    8/1985
JP    60147325    8/1985
JP    62139702    6/1987

OTHER PUBLICATIONS

European Search Report, Feb. 17, 2003.

* cited by examiner

Primary Examiner—Geoffrey L. Knable
(74) Attorney, Agent, or Firm—Brouse McDowell; Roger D. Emerson

(57) ABSTRACT

The method of folding overlap side edges of a wide breaker ply over side edges of a narrow breaker ply wrapped around the wide breaker ply on circumferentially spaced modules wherein the modules have axially movable belt lifting and conveying nose members to carry the overlap side edges of the wide breaker ply axially over the side edges of the narrow breaker ply and position the wide side edges of the wide breaker ply over the narrow breaker ply side edges. The nose members are then retracted to peel the belt away from the folded overlap side edges of the wide breaker ply.

2 Claims, 4 Drawing Sheets

METHOD OF FOLDING TIRE BREAKER PLY EDGES

This is a division of application Ser. No. 09/510,779 Tire Belt Folding Drum filed Feb. 23, 2000, now U.S. Pat. No. 6,343,638.

TECHNICAL FIELD

This invention relates to a tire breaker folding drum and method where a wide breaker ply is applied to a cylindrical drum with the leading and trailing ends spliced together. Then a narrow breaker ply is wrapped around the wide breaker ply and its ends spliced. The exposed overlap side edges of the wide breaker ply are then folded up over the narrow breaker ply along the side edges of the narrow breaker ply.

BACKGROUND OF THE INVENTION

Heretofore ply turn-ups have been made by two bladders positioned at each edge such as those shown in U.S. Pat. No. 4,427,473. In U.S. Pat. No. 5,116,449, a single bladder at each edge has been used with an outboard turnover cage to provide the turn-up. In each of these cases, the ply side edges are carried by the bladders resulting in an uncertain condition of the ply side edges after the turn-up is completed.

A breaker forming apparatus without a bladder is also shown in U.S. Pat. No. 4,063,987 where a plurality of folding segments are movable radially and axially without a bladder to fold the overlap side edges of the wide breaker ply over the side edges of the narrow breaker ply. This apparatus requires radially movable segments to hold the breaker material in place during the folding operation in the event the ply material sticks to the folding segments.

SUMMARY OF THE INVENTION

The present invention provides a drum having a plurality of circumferentially spaced apart turn-up modules positioned at the edges of the drum. Each of the modules has a nosepiece movable axially of the drum from an outer position having the same diameter as the diameter of the drum to an inner position overlapping one of the edges of the drum. A spring-loaded belt is wrapped around the nosepiece and supports the wide breaker ply overlap side edge when the wide breaker ply is applied. After the narrow breaker ply has been applied, each nosepiece is moved to an inner position overlapping the drum edge and carries the wide breaker ply overlap side edge over the side edge of the narrow breaker, pressing the overlap side edge against the narrow breaker ply. After turn-up of the wide breaker ply overlap side edge, the nosepiece is moved axially outward and the belt is peeled off the breaker so as not to distort or stretch the material. The tun-up modules are mounted on a plurality of drum segments spaced circumferentially around the drum and are retractable with the segments for removal of the folded breaker package.

In accordance with one aspect of the invention there is provided a method of building a folded breaker on a tire building drum having a plurality of drum folding modules at spaced apart edge positions circumferentially of the drum with each module having a belt with a first belt end fastened to the module and a second belt end fastened to an axially movable nose member comprising:

a. wrapping a wide breaker ply around the drum including the first belt end of each belt fastened to the module and splicing a leading end and a trailing end of said wide breaker ply together, b. wrapping a narrow breaker ply having a width less than the width of the wide breaker ply around the wide breaker ply exposing an overlap edge of the wide breaker ply at each edge of the wide breaker ply and splicing a leading end and a trailing end of the narrow breaker ply together and, c. folding each overlap edge of said wide beaker ply over each side edge of the narrow breaker ply by moving the belt carrying each overlap edge over each side edge of the narrow breaker ply by moving each nose member axially inward over each side edge of the narrow breaker ply.

In accordance with another aspect of the invention there is provided a tire building drum assembly for folding edges of a wide breaker ply over edges of a narrow breaker ply wrapped around the wide breaker ply comprising a plurality of circumferentially spaced drum segments characterized by a center module mounted on each of the drum segments, a folding module mounted on each of the segments at each end of the center module, each folding module having a nosepiece movable axially of the drum from an axially outer position having the same diameter as the diameter of the center module to an axially inner position overlapping the center module, a folding belt wrapped around each nosepiece with an axially inner end fastened to the center module and an axially outer end connected to a spring means on the nosepiece for maintaining tension in the belt providing a support for an overlap edge of the wide breaker ply in the axially outer position of the nosepiece and providing for sliding movement of the belt over the nosepiece upon axial movement of the nosepiece to the axially inner position for folding each overlap edge of the wide breaker ply over each edge of the narrow breaker ply.

Detailed Description of the Invention

Figure 1:
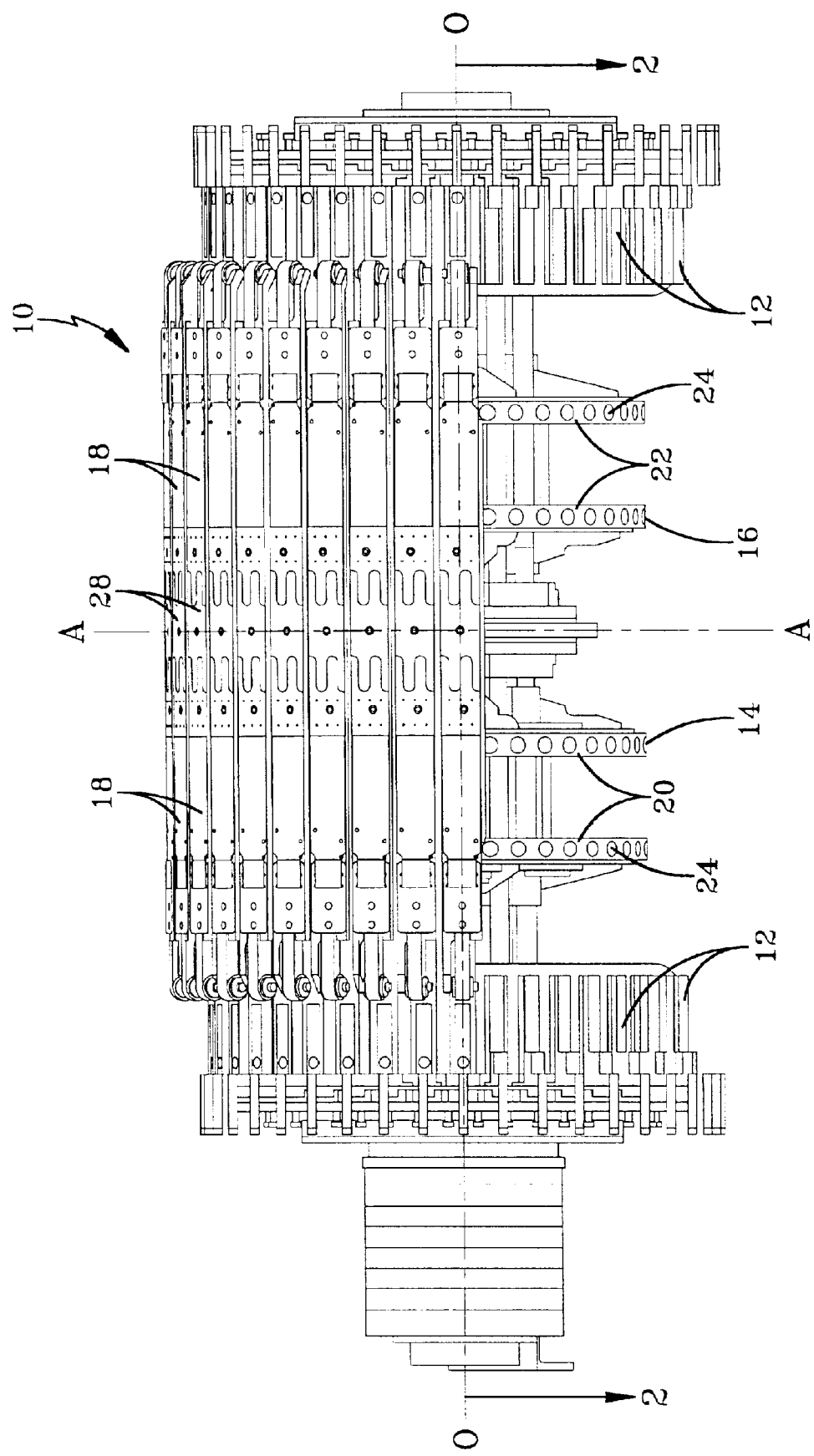
FIG. 1 is an elevation of a breaker-folding drum embodying the invention with the lower center modules and folding modules broken away to show the hub assemblies.
Figure 2:
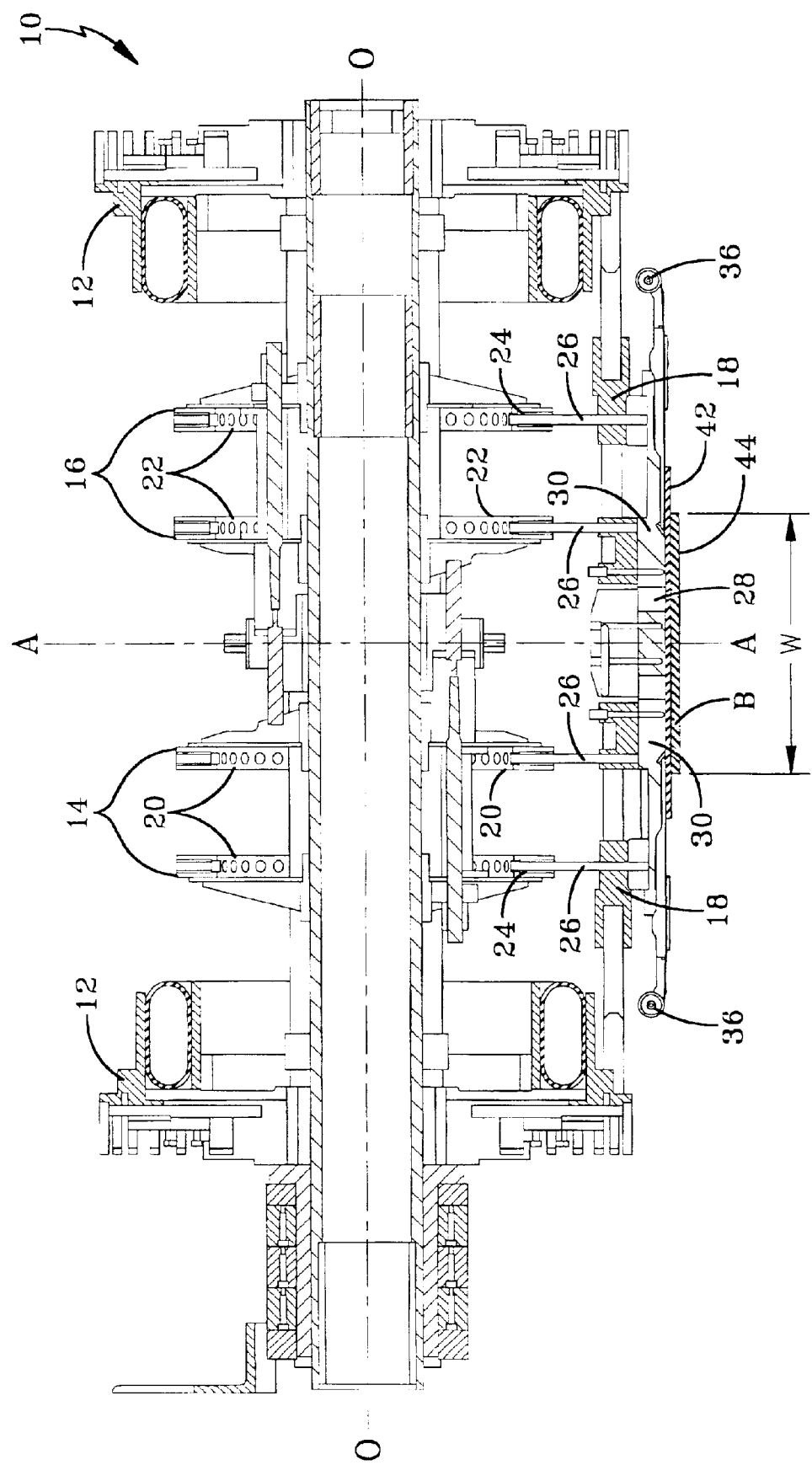
FIG. 2 is a sectional view of the drum and a folding module taken along the plane of line 2—2 in FIG. 1.

Referring to FIGS. 1 and 2, a breaker folding drum assembly 10 is shown having circumferentially spaced drum segments 12 arranged radially around the circumference of the drum. Two axially spaced hub assemblies 14 and 16 are positioned symmetrically about a lateral centerline A—A of the drum assembly 10. A manually operated acme screw with symmetrical left and right hand threads (not shown) engages nuts mounted on the inner set of hub assemblies 14 and 16 so that as the screw is rotated the hub assemblies and attached folding modules 18 move symmetrically about the lateral centerline A—A of the drum assembly 10.

Each of the hub assemblies 14 and 16 has circular hubs 20 and 22, with each hub of the assemblies 14, 16 having a set of radially extending bushings 24. There is one bushing 24 for each of the drum segments 12. An inner shaft 26 is inserted into the corresponding bushing 24 of the inner circular hubs 20 and 22 and each of the shafts is attached to one of the folding modules 18. The hub assemblies 14 and 16 and shafts 26 provide the fold width setting for the drum segments 12. In the embodiment shown there are forty drum segments 12, however, this may be adjusted depending upon the size of the drum assembly 10 and the breaker package to be folded.

In addition to the drum segments 12, center modules 28 are mounted on the inner shafts 26 and interlock with the folding modules 18 at each end of the drum assembly 10. The center modules 28 are replaceable and the folding modules 18 can be adjusted for the desired folding width W shown in FIG. 2. Holes (not shown) may be provided in the center modules 28 and folding modules 18 in communication with the source of vacuum to help hold the breaker stock B on the drum segments 12.

Figure 3:
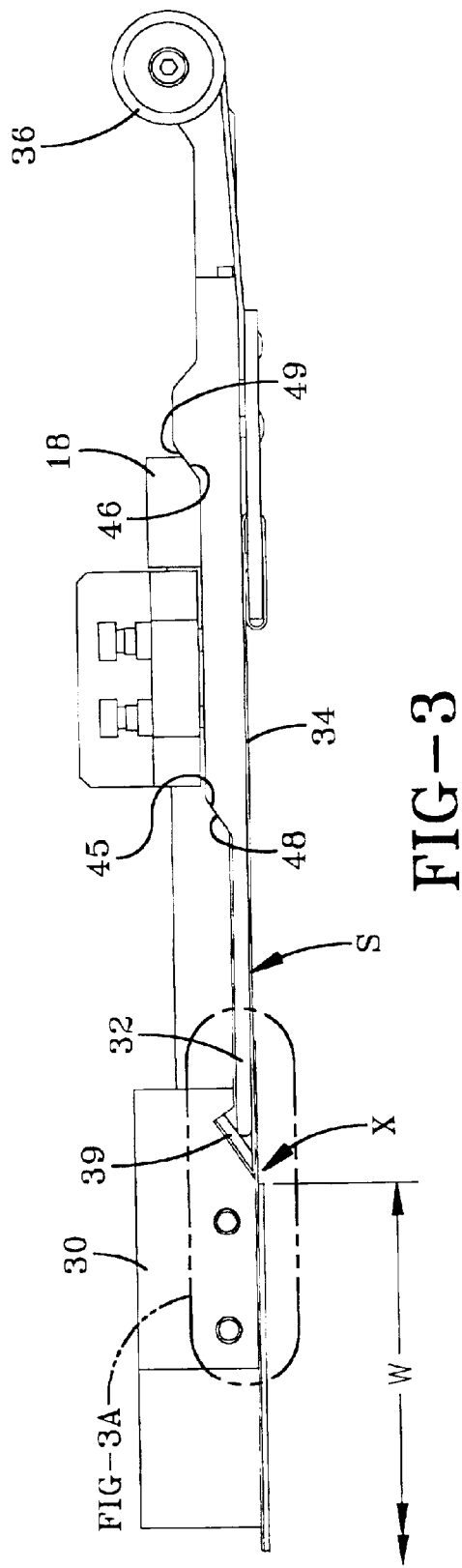
FIG. 3 is an enlarged view of one of the folding modules in the retracted condition.
Figure 3A:
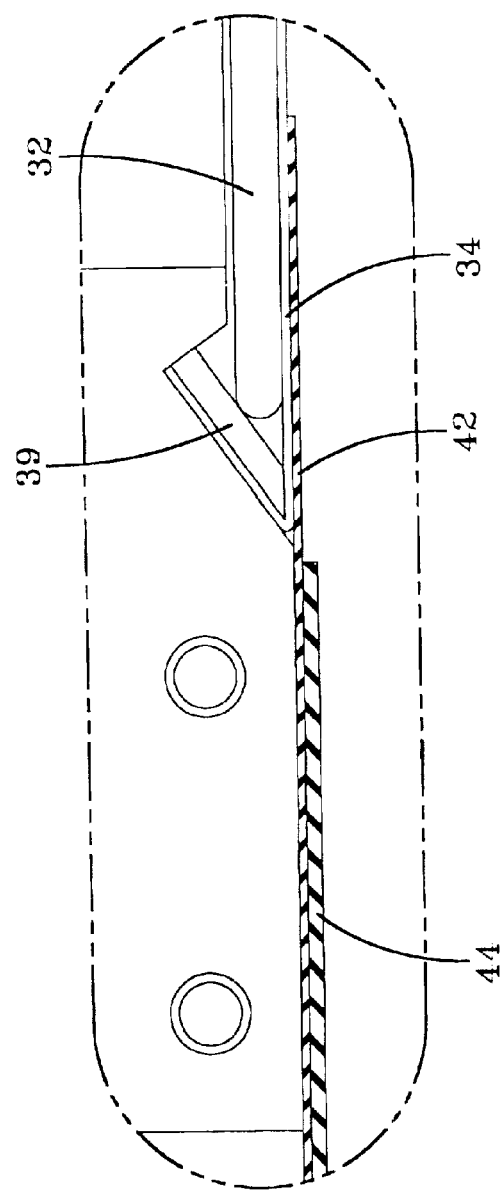
Figure 4:
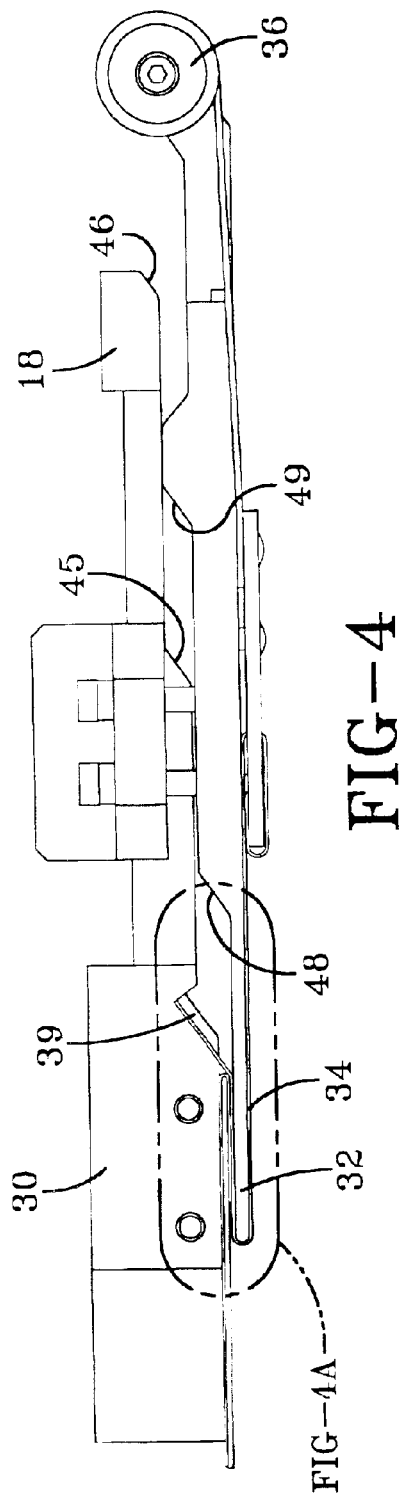
FIG. 4 is a view like FIG. 3 with one of the folding modules in the folding position.
Figure 4A:
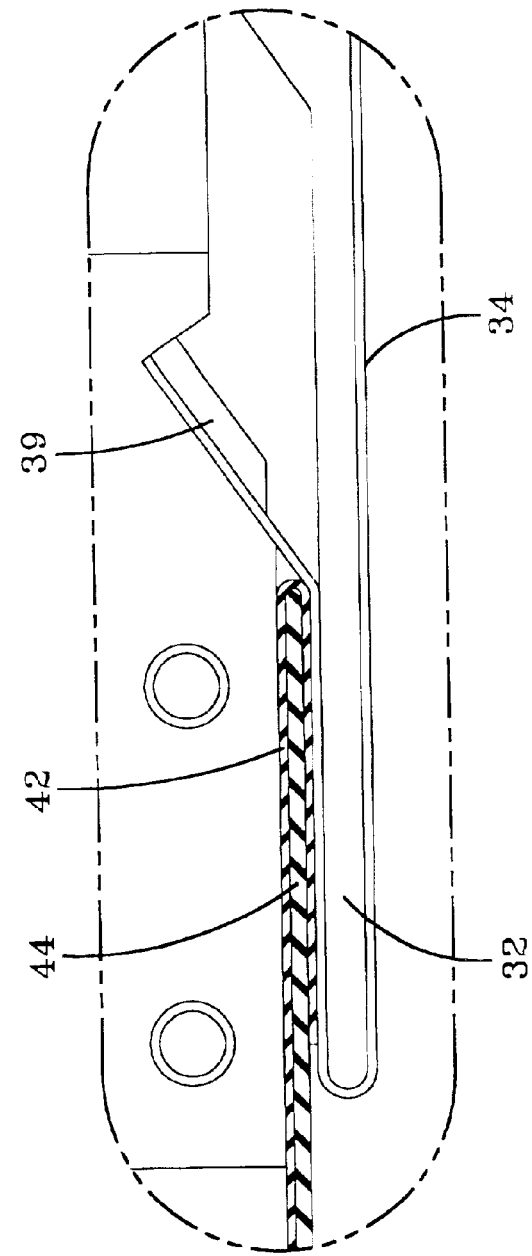

Referring to FIGS. 3 and 4, each folding module 18 includes a base piece 30, a relatively thin nosepiece 32, a belt member 34 and a spring assembly 36 attached to the belt member at one end and mounted on the nosepiece. The other end of the belt member 34 is attached to the base piece 30 by a bracket 39. The belt member 34 is wrapped around the leading end of the nosepiece 32 and lays flat across the top surface of the nosepiece. In the retracted position shown in FIG. 3, the folding module 18 presents a flat horizontal surface S. Part of this surface S consists of the radially outer surface of the base piece 30, and the other part consists of the belt member 34 disposed on top of the nosepiece 32 as shown in FIG. 3. The line of contact X where the belt member 34 is attached to the base piece 30 by bracket 39 is where the folding will occur.

Diameter adjustment may be provided by linear bearings for each end of each drum segment 12. Bearing blocks of the linear rails are attached radially on a common disk. The linear rails move radially within the bearing blocks to provide diameter adjustment. The drum segments 12 are attached to brackets on the linear rails so that each of the drum segments is supported by one linear rail at each end. Inflatable bladders (not shown) may be provided to move all of the segments diametrically outward when air pressure is applied. The limit of travel is provided by a control ring, which contacts the blocks mounted on the linear rails. This determines a specific working diameter of the drum assembly 10. The control rings are replaceable for different building diameters. Other methods of diameter adjustment may be provided, such as using a rotating disk with a spiral slot wherein elements on the linear rails engage the spiral slot and the drum diameter maybe adjusted by rotating the disk.

In operation the drum assembly 10 is adjusted to the desired folding width W and expanded to the building diameter. The wide breaker ply 42 is wrapped around the breaker folding drum assembly 10 and a leading end and a trailing end spliced. Next, a narrow breaker ply 44 is wrapped around the wide breaker ply 42 and a leading end and a tracking end spliced. Internal air motors may be actuated causing the outer hubs 24 to move in towards the centerline A—A of the drum assembly 10. The hubs 24 move each nosepiece 32 towards the centerline A—A of the drum assembly 10. The hubs 24 carry the nosepieces 32 on the folding modules 18 towards the centerline A—A of the drum assembly 10 by movement of the connecting shafts 26. Beveled surfaces 45 and 46 on the base piece 30 contact corresponding beveled surfaces 48 and 49 on the nosepiece 32 as the nosepiece moves axially inward and to maintain the nosepiece surface at an equal distance from the axis O—O of the drum assembly 10. This minimizes stretching of the plies during the folding process. The belt members 34 which are wrapped around the nosepiece move axially inwards and over the base piece causing the overlap edges of the wide breaker ply 42 to begin folding over the narrow breaker ply 44. During this movement there is no relative motion between the belt member 34 and the wide breaker 42 since all of the sliding action takes place between the nosepiece 32 and the belt member 34. When the nosepiece 32 completes the axially inward motion to the position shown in FIG. 4, the fold is completed. The direction of the air motors is then reversed wherein the outer hub assembly 16 moves axially outward and carries the folding modules 18 to the original positions shown in FIG. 3. During this movement each belt member 34 is peeled off each folded wide breaker ply 42 and returned to the position shown in FIG. 3.

Subsequent tire building operations may then be performed on the drum assembly 10, after which the drum assembly may be collapsed allowing the breaker tread package to be removed from the drum assembly.

While a certain representative embodiment and details have been shown for the purpose of illustrating the invention, it will be apparent to those skilled in the art that various changes and modification may be made therein without departing from the scope of the invention.

Having thus described the invention, it is now claimed:

1. A method for folding edges of a wide breaker ply over edges of a narrow breaker ply, said narrow breaker ply wrapped around said wide breaker ply on a plurality of circumferentially spaced radially movable drum segments, wherein each of said drum segments has a center module, said center module having ends and a folding module mounted on each end, each of said folding modules has a nose piece movable axially of said drum from an axially outer position to an axially inner position overlapping said center module with a folding belt, each said folding belt being wrapped around each said nose piece and having an axially outer end connected to a spring means on said nose piece for maintaining tension in said belt, the method comprising the steps of:

wrapping said wide breaker ply over said center module and said folding belt on each said nose piece of each end of said center module;

folding edges of said wide breaker ply over edges of said narrow breaker ply by moving each said nose piece axially inward over said center module with said folding belt sliding over said nose piece upon said axially inward movement of said nose piece;

moving each of said nose pieces axially outward for peeling said belt from said folded edges of said wide breaker ply;

moving said drum segments radially inward; and removing said wide breaker ply and said narrow breaker ply from said drum segments.

2. The method of claim 1 further characterized by maintaining each said overlap edge of said wide breaker ply in contact with said belt during said application over each said edge of said narrow breaker ply by maintaining said belt in tension.

* * * * *